(12) United States Patent
Li (10) Patent No.: US 10,877,238 B2
(45) Date of Patent: Dec. 29, 2020

(54) BOKEH CONTROL UTILIZING TIME-OF-FLIGHT SENSOR TO ESTIMATE DISTANCES TO AN OBJECT

(71) Applicant: STMicroelectronics (Beijing) R&D Co. Ltd, Beijing (CN)

(72) Inventor: Yong Li, Beijing (CN)

(73) Assignee: STMICROELECTRONICS (BEIJING) R&D CO. LTD, Beijing (CN)

( * ) Notice: Subject to any disclaimer, the term of this patent is extended or adjusted under 35 U.S.C. 154(b) by 0 days.

(21) Appl. No.: 16/037,766

(22) Filed: Jul. 17, 2018

(65) Prior Publication Data

US 2020/0026031 A1 Jan. 23, 2020

(51) Int. Cl.
| | | |
|---|---|---|
| *G02B 7/28* | (2006.01) | |
| *G01S 17/10* | (2020.01) | |
| *G03B 13/20* | (2006.01) | |
| *G02B 7/09* | (2006.01) | |
| *G03B 13/36* | (2006.01) | |
| *G01S 17/86* | (2020.01) | |

(52) U.S. Cl.
CPC ............. *G02B 7/287* (2013.01); *G01S 17/10* (2013.01); *G01S 17/86* (2020.01); *G02B 7/09* (2013.01); *G03B 13/20* (2013.01); *G03B 13/36* (2013.01)

(58) Field of Classification Search
None
See application file for complete search history.

(56) References Cited

U.S. PATENT DOCUMENTS

| | | | |
|---|---|---|---|
| 7,792,420 B2 | 9/2010 | Kusaka | |
| 7,852,461 B2 | 12/2010 | Yahav | |
| 8,355,627 B2 | 1/2013 | Pace et al. | |
| 8,724,013 B2 * | 5/2014 | Safaee-Rad | G02B 7/38 348/349 |
| 9,813,693 B1 * | 11/2017 | Baldwin | G06T 7/60 |
| 2013/0322863 A1 | 12/2013 | Lee et al. | |
| 2014/0037135 A1 | 2/2014 | Kutliroff et al. | |

(Continued)

OTHER PUBLICATIONS

Jasper McChesney, You should summarize data with the geometric mean, Dec. 15, 2016 (Year: 2016).*

(Continued)

*Primary Examiner* — James M Hannett
(74) *Attorney, Agent, or Firm* — Seed IP Law Group LLP (57) ABSTRACT

Embodiments are directed to devices and methods including a time-of-flight sensor and a camera. In one embodiment, a device is provided that includes a time-of-flight sensor, distance estimation circuitry, a camera, and processing circuitry. The time-of-flight sensor transmits an optical pulse signal and receives return optical pulse signals corresponding to portions of the transmitted optical pulse signal reflected by an object. The distance estimation circuitry estimates a minimum distance to the object based on a time between transmitting the optical pulse signal and receiving a first portion of the return optical pulse signals, and estimates a maximum distance to the object based on a time between transmitting the optical pulse signal and receiving a second portion of the return optical pulse signals. The processing circuitry controls a focus distance and an aperture setting of the camera based on the estimated minimum and maximum distances to the object.

22 Claims, 4 Drawing Sheets

(56) References Cited

U.S. PATENT DOCUMENTS

| | | | |
|---|---|---|---|
| 2015/0092073 A1* | 4/2015 | Park | H04N 5/232 |
| | | | 348/218.1 |
| 2015/0116577 A1* | 4/2015 | Lin | H04N 5/23212 |
| | | | 348/345 |
| 2017/0180713 A1* | 6/2017 | Trail | G06F 3/011 |
| 2017/0353649 A1 | 12/2017 | Yang et al. | |
| 2017/0374269 A1 | 12/2017 | Govindarao et al. | |
| 2018/0089848 A1 | 3/2018 | Yang et al. | |
| 2018/0176483 A1* | 6/2018 | Knorr | G06T 19/006 |

OTHER PUBLICATIONS

"Depth Perception | Tango | Google Developers," last updated Feb. 14, 2017, retrieved from https://developers.google.com/tango/overview/depth-perception on Jan. 19, 2018, 7 pages.

Huhle et al., "Realistic Depth Blur for Images with Range Data," Proceedings of the DAGM 2009 Workshop on Dynamic 3D Imaging, Jena, Germany, Sep. 9, 2009, 12 pages.

* cited by examiner

BOKEH CONTROL UTILIZING TIME-OF-FLIGHT SENSOR TO ESTIMATE DISTANCES TO AN OBJECT

BACKGROUND

Technical Field

The present disclosure generally relates to control of settings in image capture devices such as digital cameras, and more specifically to the utilization of time of flight range detection in control of settings in image capture devices.

Description of the Related Art

Bokeh is a term used in photography which refers to an aesthetic quality of the blur produced in out-of-focus parts of an image produced by a lens. Bokeh is therefore related to the depth of field, which is the distance about a plane of focus where objects appear acceptably sharp in an image. In general, the smallest depth of field which sufficiently captures the target object in the image is preferred so that the target appears to be standing out (e.g., in sharp focus) from the background.

To produce images having a good or visually pleasing bokeh effect, a photographer generally needs to manually adjust camera settings such as focus distance and aperture size in order to obtain a particular depth of field of the camera that provides a good bokeh effect. Typically, this involves a great deal of trial and error for the novice photographer, and even expert photographers generally rely on past experience to adjust the camera settings in order to produce images having a good bokeh effect.

Ranging devices, such as time-of-flight (TOF) sensors, are typically used to detect the distance to nearby objects and are able to do so without physically touching the object. Conventional TOF sensors may be used for object detection, proximity detection, and further may be used to determine an actual range or distance from the device to a detected object. Such devices may be utilized in various electronic devices, such as cameras, phones, including smart phones, vehicles, machinery, and other devices for detecting the distance to nearby objects.

Conventional TOF sensors or devices typically include a light-emitting device (e.g., a laser or a light emitting diode (LED)), a return or target sensor array, a reference sensor array, and circuitry for driving an output light emission and for processing signals received by the return and reference sensor arrays. The return and reference sensor arrays may be single-photon avalanche diode (SPAD) arrays.

Generally described, the light-emitting device emits radiation into an image scene. Some portion of the emitted radiation is reflected off of an object in the image scene and back toward the return sensor array. Another portion of the emitted radiation is reflected by an internal optical barrier, and this reflected radiation is received by the reference sensor array. The return and reference arrays generate respective electrical signals indicative of the received radiation, which is transmitted to the processing circuitry (e.g., a readout circuit) which determines the distance to the object based on a difference in time in receiving the signals from the return and reference sensor arrays.

BRIEF SUMMARY

The present disclosure is generally directed to devices and methods utilizing a TOF sensor and an imaging device, such as a digital camera. The TOF sensor is utilized to estimate a minimum distance and a maximum distance to a target object in a scene. The estimated minimum and maximum distances are used as approximate values for the near limit and far limit of the camera's depth of field, and an appropriate focus distance and aperture setting (e.g., aperture size) of the camera may be determined based on the estimated minimum and maximum distances to provide a good bokeh effect in an acquired image. The camera may automatically adjust or select the focus distance and an aperture setting based on the estimated minimum and maximum distances to the target object.

In one embodiment, the present disclosure provides a method that includes: transmitting, by a time-of-flight sensor device, an optical pulse signal into an image scene; receiving, by the time-of-flight sensor device, return optical pulse signals corresponding to portions of the transmitted optical pulse signal reflected by an object in the image scene; estimating a minimum distance to the object based on a time between transmitting the optical pulse signal and receiving a first portion of the return optical pulse signals; estimating a maximum distance to the object based on a time between transmitting the optical pulse signal and receiving a second portion of the return optical pulse signals; and controlling a focus distance and an aperture setting of a camera based on the estimated minimum and maximum distances to the object.

In another embodiment, the present disclosure provides a device that includes a time-of-flight sensor, distance estimation circuitry, a camera, and processing circuitry. The time-of-flight sensor, in operation, transmits an optical pulse signal into an image scene and receives return optical pulse signals corresponding to portions of the transmitted optical pulse signal reflected by one or more objects in the image scene. The distance estimation circuitry, in operation, estimates a minimum distance to the at least one object based on a time between transmitting the optical pulse signal and receiving a first portion of the return optical pulse signals, and estimates a maximum distance to the at least one object based on a time between transmitting the optical pulse signal and receiving a second portion of the return optical pulse signals. The processing circuitry is coupled to the distance estimation circuitry and the camera, and in operation, the processing circuitry controls a focus distance and an aperture setting of the camera based on the estimated minimum and maximum distances to the at least one object.

In yet another embodiment, the present disclosure provides a method that includes: transmitting, by a time-of-flight sensor device, an optical pulse signal into an image scene; receiving, by the time-of-flight sensor device, first return optical pulse signals corresponding to portions of the transmitted optical pulse signal reflected by a first object in the image scene; receiving, by the time-of-flight sensor device, second return optical pulse signals corresponding to portions of the transmitted optical pulse signal reflected by a second object in the image scene; estimating a first minimum distance and a first maximum distance to the first object based on a time between transmitting the optical pulse signal and receiving the first return optical pulse signals; estimating a second minimum distance and a second maximum distance to the second object based on a time between transmitting the optical pulse signal and receiving the second return optical pulse signals; and controlling a focus distance and aperture size of a camera based on one of: the estimated first minimum and first maximum distances to the first object or the estimated second minimum and second maximum distances to the second object.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the Disclosure provided herein are for convenience only and do not interpret the scope or meaning of the embodiments.

In the present description, certain details are set forth in conjunction with the described embodiments to provide a sufficient understanding of the present disclosure. One skilled in the art will appreciate, however, that the embodiments may be practiced without these particular details. Furthermore, one skilled in the art will appreciate that the example embodiments described below do not limit the scope of the present disclosure, and will also understand that various modifications, equivalents, and combinations of the disclosed embodiments and components of such embodiments are within the scope of the present disclosure. Embodiments including fewer than all the components of any of the respective described embodiments may also be within the scope of the present disclosure although not expressly described in detail below. Finally, the operation of well-known components and/or processes has not been shown or described in detail below to avoid unnecessarily obscuring the present disclosure.

Figure 1:
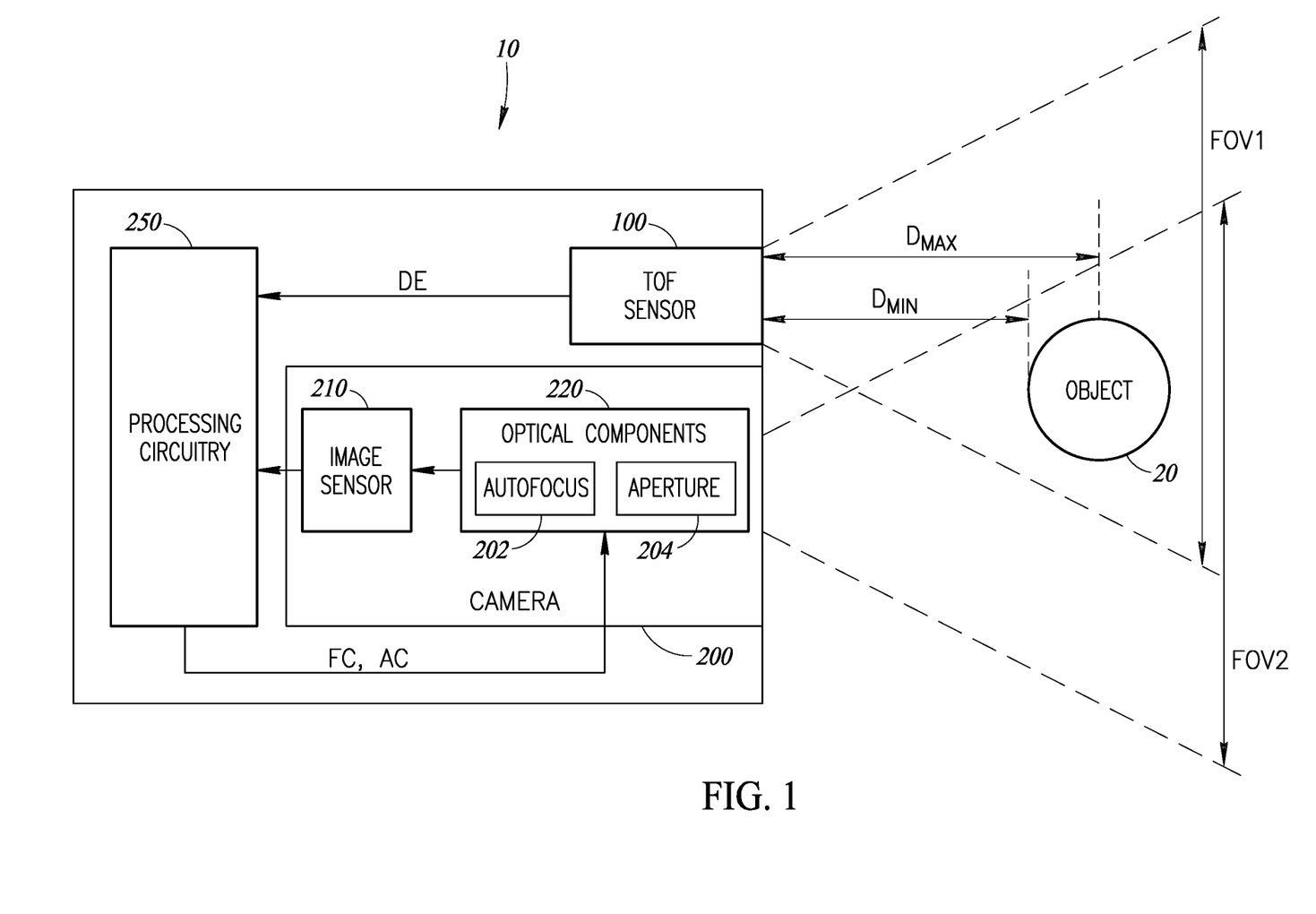
FIG. 1 is a functional block diagram illustrating an image capture device having a time-of-flight (TOF) sensor and a camera, in accordance with one or more embodiments of the present disclosure.

Turning now to FIG. 1, illustrated therein is a functional block diagram illustrating an image capture device 10, in accordance with one or more embodiments of the present disclosure.

The image capture device 10 includes a time-of-flight (TOF) sensor 100, a camera 200 and processing circuitry 250. The TOF sensor 100 has a first field of view FOV1 and the camera 200 has a second field of view FOV2, and the first and second fields of view FOV1, FOV2 at least partially overlap. Thus, both the TOF sensor 100 and the camera 200 are capable of detecting an object 20 in an image scene. While the first and second fields of view FOV1, FOV2 are shown in FIG. 1 as only partially overlapping, in various embodiments, the first and second fields of view FOV1, FOV2 may substantially overlap and may even be completely overlapping so that the camera 200 and the TOF sensor 100 have a same field of view.

As will be described in further detail below, the TOF sensor 100 transmits an optical pulse signal into the image scene, and the optical pulse signal is at least partially reflected by the object 20. The TOF sensor 100 receives return optical pulse signals which correspond to portions of the transmitted optical pulse signal that is reflected by the object 20 in the image scene. Based on the timing of transmitting the optical pulse and receiving the return optical pulse signals, the TOF sensor 100 estimates a minimum distance $D_{min}$ and a maximum distance $D_{max}$ to the object 20.

More particularly, the TOF sensor 100 estimates the minimum distance $D_{min}$ to the object 20 based on a time between transmitting the optical pulse signal into the image scene and receiving a first portion of the return optical pulse signals. The first portion of the return optical pulse signals correspond with portions of the optical pulse that are reflected from a nearest surface or portion of the object 20. Similarly, the TOF sensor 100 estimates the maximum distance $D_{max}$ to the object 20 based on a time between transmitting the optical pulse signal and receiving a second portion of the return optical pulse signals. The second portion of the return optical pulse signals correspond with portions of the optical pulse that are reflected from a farthest visible surface or portion of the object 20. For example, when the object 20 is spherical as shown in FIG. 1, the farthest visible portion (i.e., perceptible to the TOF sensor 100 within its field of view FOV1) of the object 20 is an outer surface of the object 20 along a plane that is horizontal to the TOF sensor 100 and which passes through a center of the spherical object 20. It should be readily appreciated that the object 20 can have any shape or size, and the TOF sensor 100 is capable of estimating the minimum and maximum distances $D_{min}$, $D_{max}$ to objects having any shape or size. In effect, the minimum and maximum distances $D_{min}$, $D_{max}$ represent a perceptible depth of the object 20.

The camera 200 includes optical components 220 that route and guide light within the second field of view FOV2 of the camera 200 to an image sensor 210 that captures an image of the object 20. The optical components 220 may include any optical components, and typically would include one or more lenses, filtering components, and the like which may be found in conventional camera systems. Additionally, the optical components 220 include adjustable components or components having adjustable parameters, including autofocus components 202 which may adjust a focal distance of the camera 200 for focusing captured images on the image sensor 210, and aperture components 204 or settings which may adjust an aperture size of the camera 200.

The image sensor 210 may be any suitable type of image sensor, such as a charge coupled device (CCD) type image sensor or a complementary metal oxide semiconductor (CMOS) image sensor, and captures an image of the object 20 from the light provided by the optical components 220. The image sensor 210 provides captured images to the processing circuitry 250, which controls the image sensor to capture images and would typically store the captured images and provide other image capture related processing of the captured images.

Moreover, the processing circuitry 250 controls settings of the camera 200, such as the focus distance and aperture size, based on the estimated minimum and maximum distances $D_{min}$, $D_{max}$, as will be described in further detail later herein.

Figure 2:
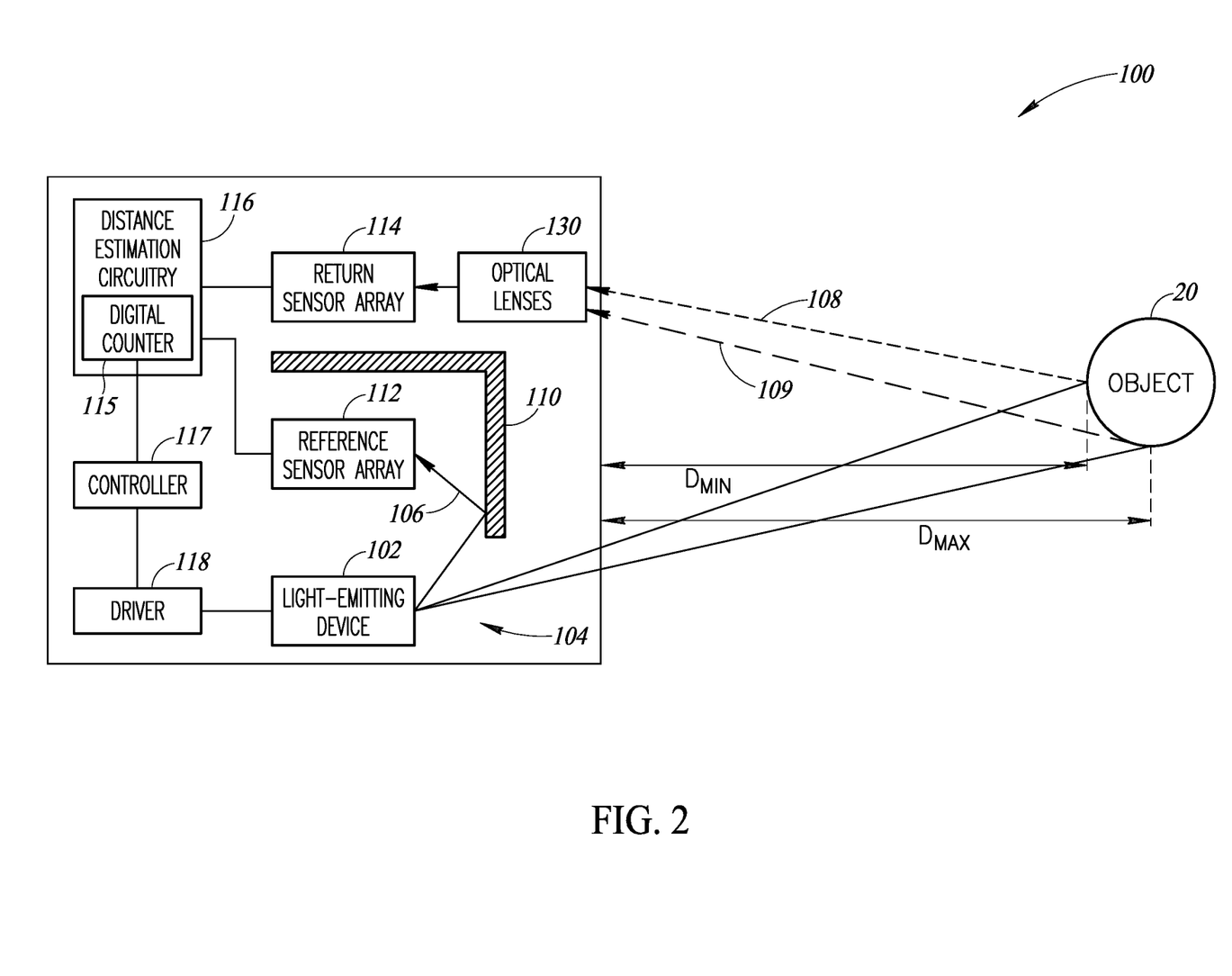
FIG. 2 is a functional block diagram illustrating the TOF sensor of FIG. 1 in further detail.

FIG. 2 is a functional block diagram illustrating the TOF sensor 100 in further detail. As shown in FIG. 2, the TOF sensor 100 includes a light-emitting device 102 for generating and transmitting an optical pulse 104 into an image scene, which may contain an object 20. In one or more embodiments, the light-emitting device 102 is a laser, which may be, for example, a vertical cavity surface emitting laser (VCSEL).

An optical barrier 110 is included in the TOF range detection device 100, and reflects a reference portion 106 of the optical pulse toward a reference sensor array 112, which may be, for example, a single-photon avalanche diode (SPAD) array. Other light sensors may be employed as the reference sensor array 112 in various embodiments, including, for example, avalanche diodes, charge-coupled device (CCD) or CMOS imagers.

The optical pulse 104 is a beam of light that is emitted along the field of view FOV1 (see FIG. 1) of the TOF sensor 100. For example, the optical pulse 104 may be emitted toward an area (e.g., into the image scene), and various different portions of the optical pulse 104 may be reflected by various different surfaces or features in the image scene. In the example shown in FIG. 2, a first portion 108 of the optical pulse 104 is reflected off of a nearest surface of the object 20 and is received at a return sensor array 114, which may also be a SPAD array. A second portion 109 of the optical pulse 104 is reflected off of a farthest surface of the object 20 and is received at the return sensor array 114. Only the portions of reflected light corresponding to the nearest and farthest perceptible surfaces of the object 20 are shown in FIG. 2; however, it will be readily appreciated that numerous other components of light corresponding to reflections off of all of the perceptible portions of the object 20 may be received by the return sensor array 114.

In one or more embodiments, the TOF sensor device 100 further includes optical lenses 130. The optical lenses 130 receive the reflected portions (including the first and second portions 108, 109) of the optical pulse, and focus the reflected portions on the return sensor array 114.

The return sensor array 114 may include, for example, an array of between four and several hundred SPAD cells. As will be appreciated by those skilled in the art, SPAD arrays can be used for a variety of applications, including for ranging, for 2D or 3D gesture recognition and for 3D imaging. Each SPAD cell in the return sensor array 114 will provide an output pulse or detectable SPAD event when a photon in the form of the reflected first portion 108, second portion 109 or any other reflected portion of the optical pulse 104 is detected by that cell, and by monitoring these SPAD events an arrival time of the return pulse can be estimated or detected by the distance estimation circuitry 116.

The reference sensor array 112 may be, for example, of the same dimensions or of smaller dimensions than the return sensor array 114, and receives an internal reflection (e.g., reflected by the optical barrier 110) 106 of the transmitted optical pulse 104. In some embodiments, the reference sensor array 112 is a mono-dimensional array, for example, having only a row or column of SPAD cells.

The distance estimation circuitry 116 is coupled to the return sensor array 114 and the reference sensor array 112 and estimates the distance between the TOF sensor 100 and the object 20 in the image scene against which the optical pulses reflect. More particularly, the TOF sensor 100 estimates the minimum distance $D_{min}$ to the object 20 based on a time between transmitting the optical pulse signal 104 into the image scene and receiving the first portion 108 of the return optical pulse signals. Similarly, the TOF sensor 100 estimates the maximum distance $D_{max}$ to the object 20 based on a time between transmitting the optical pulse signal 104 and receiving the second portion 109 of the return optical pulse signals.

The distance estimation circuitry 116 utilizes suitable circuitry, such as time-to-digital converters or time-to-analog converters that generate an output indicative of a time difference that may then be used to determine the time of flight of the transmitted optical pulse 104 and thereby the minimum and maximum distances $D_{min}$, $D_{max}$ to the object 20, as will be appreciated by those skilled in the art.

In one or more embodiments, the distance estimation circuitry 116 includes a digital counter 115, which counts a number of photons received at the return sensor array 114 and the reference sensor array 112 within preset windows or bins of time. Then, by analysis of the photon counts received at the return sensor array 114 and the reference sensor array 112, the distance estimation circuitry 116 may determine the minimum and maximum distances $D_{min}$, $D_{max}$ to the object 20.

The TOF sensor 100 may further include a driver 118 that generates a driving signal for driving the light-emitting device 102, e.g., by specifying or otherwise controlling an output power of the optical pulse 104 generated by the light-emitting device 102. The driver 118 may be controlled by a controller 117 that is coupled to the distance estimation circuitry 116 and the driver 118.

Figure 3A:
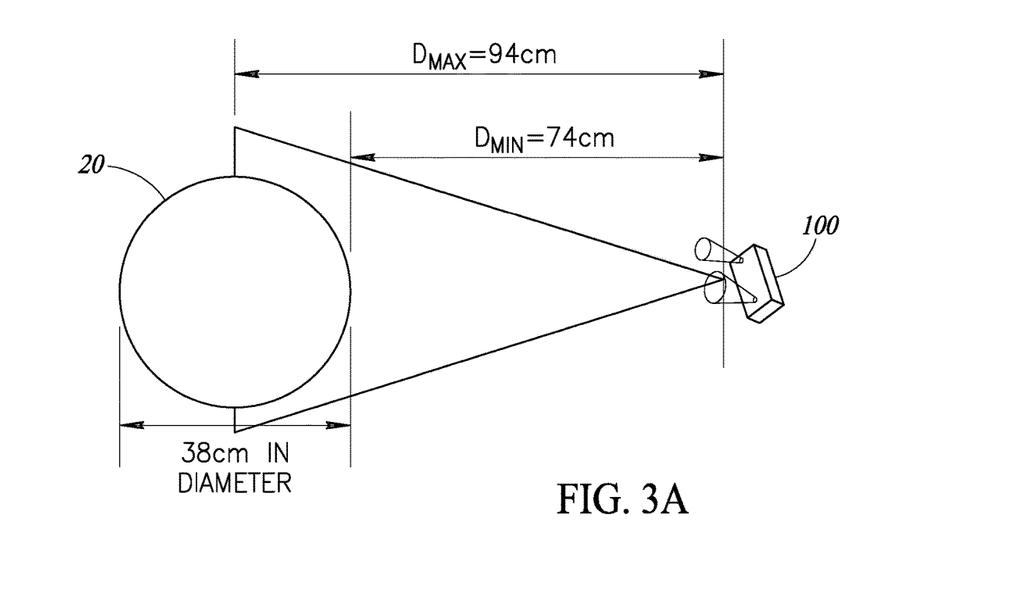
FIG. 3A is a diagram illustrating an example of estimation of minimum and maximum distances to an object by the TOF sensor, in accordance with one or more embodiments.
Figure 3B:
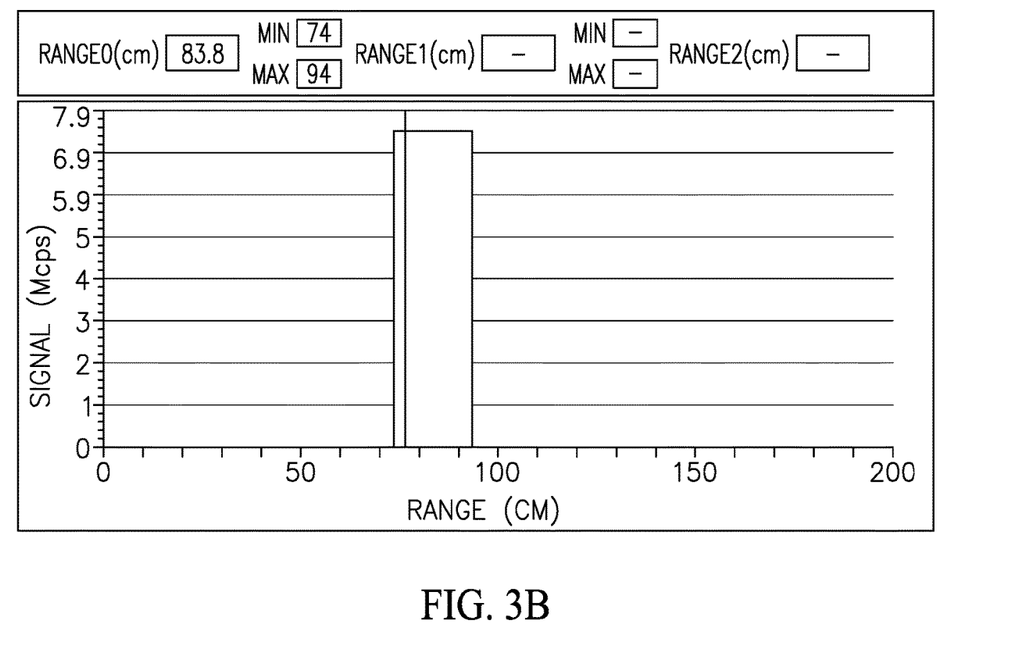
FIG. 3B is a plot illustrating ranging data generated by the TOF sensor in the example of FIG. 3A which is used to estimate the minimum and maximum distances.

FIG. 3A is a diagram illustrating the estimating of minimum and maximum distances $D_{min}$, $D_{max}$ to an object 20 by the TOF sensor 100, and FIG. 3B is a plot illustrating ranging data generated by the TOF sensor 100 which is used to estimate the minimum and maximum distances $D_{min}$, $D_{max}$.

The TOF sensor 100 may estimate the minimum and maximum distances $D_{min}$, $D_{max}$ using any suitable techniques. One such technique that facilitates estimation of minimum and maximum distances $D_{min}$, $D_{max}$ to an object is a histogram based technique as described, for example, in application Ser. No. 15/616,641, filed Jun. 7, 2017 (published as US 2017/0353649), and in application Ser. No. 15/476,100, filed Mar. 31, 2017 (published as US 2018/0089848), which applications are incorporated by reference herein in their entireties. Such histogram based time-offlight detection techniques facilitate estimating depths of one or more objects in the field of view of the TOF sensor, and the depth information can be translated to minimum and maximum distances to the one or more objects, in accordance with one or more embodiments of the present disclosure. In one or more embodiments, a histogram based time-of-flight detection technique is utilized by the TOF sensor 100 to detect minimum and maximum distances to multiple objects present within the field of view of the sensor, as will be described in more detail below with respect to FIG. 4.

Referring again to FIGS. 3A and 3B, the TOF sensor 100 may sense the object 20, which may be a ball having a diameter of 38 cm. The TOF sensor 100 emits light into the field of view, and reflected portions of the light which are reflected from perceptible portions or surfaces of the object 20 are received by the TOF sensor 100. For example, the TOF sensor 100 receives reflected portions of light corresponding to all portions of the object 20 between the minimum distance $D_{min}$ and the maximum distance $D_{max}$. This is reflected in the plot of FIG. 3B, in which ranging data is generated by the TOF sensor 100 within a range from a minimum distance of 74 cm and a maximum distance of 94 cm. More particularly, the return sensor array 114 of the TOF sensor 100 generates outputs indicating SPAD events or the reception of photons, which are translated to time-of-flight distance information for each SPAD event or received photon, for example, by the distance estimation circuitry 116. As shown in FIG. 3B, the return sensor array 114 and/or the distance estimation circuitry 116 may output a signal indicating a count of SPAD events or received photons (y-axis; scale of millions of counts per second (Mcps)) associated with particular distances (x-axis), and the distances may be obtained by the distance estimation circuitry 116, for example, based on a difference in time from transmission of an optical pulse and receipt of reflected portions of the optical pulse).

As shown in the example of FIGS. 3A and 3B, the TOF sensor 100 estimates a minimum distance $D_{min}$ of 74 cm to the object 20, and a maximum distance $D_{max}$ of 94 cm to the object 20. These minimum and maximum distances $D_{min}$, $D_{max}$ may then be supplied, for example, as distance estimation signals DE from the distance estimation circuitry 116 to the processing circuitry 250 shown in FIG. 1.

The processing circuitry 250 includes circuitry configured to determine, based on the estimated minimum and maximum distances $D_{min}$, $D_{max}$, a focus distance and an aperture setting (e.g., an aperture size or f-stop) to achieve a good bokeh effect in an image of the object 20. The processing circuitry 250 further includes circuitry configured to automatically adjust the optical components 220 to achieve the determined focus distance and aperture setting. In one or more embodiments, the processing circuitry 250 may be or include, for example, one or more microprocessors programmed to implement the various features described herein with respect to the processing circuitry 250. Furthermore, in one or more embodiments, various features of the TOF sensor 100, including for example the distance estimation circuitry 116, may be implemented by the processing circuitry 250.

The processing circuitry 250 may also include other circuitry or functionality for controlling the overall operation of the image capture device 10. The specific structure and functionality of the processing circuitry 250 will depend on the nature of the image capture device 10. For example, the image capture device 10 may be a stand-alone digital camera or may be digital camera components contained within another type of electronic device, such as a smart phone or tablet computer. Thus, in FIG. 1 the processing circuitry 250 represents circuitry contained in the image capture device 10 but also generally represents circuitry of other electronic devices, such as a smart phone or tablet computer, where the image capture device 10 is part of another electronic device. For example, where the image capture device 10 is part of a mobile device like a smart phone, the processing circuitry 250 may control the overall operation of the smart phone and may also execute various applications that provide specific functionality for a user of the mobile device.

Generally, for a good bokeh effect, the camera 200 should be adjusted to have the smallest depth of field (DOF) which sufficiently captures the target object in an image, so that the target appears to be standing out (e.g., in sharp focus) from the background. The processing circuitry 250 utilizes the estimated minimum and maximum distances $D_{min}$, $D_{max}$ to a target object as approximate values for the near limit and far limit of the DOF of the camera 200, and an appropriate focus distance and aperture setting (e.g., aperture size) of the camera 200 may be determined by the processing circuitry 250 based on the estimated minimum and maximum distances $D_{min}$, $D_{max}$ to provide a good bokeh effect in an acquired image.

The focus distance, s, of a camera is related to the near and far limits $D_N$, $D_F$ of the DOF in accordance with the following equation (1):

$$s = \frac{2 D_F D_N}{D_F + D_N}$$

However, as noted above, the processing circuitry 250 utilizes the estimated minimum and maximum distances $D_{min}$, $D_{max}$ as approximates for the near and far limits $D_N$, $D_F$. Accordingly, in the example shown in FIGS. 3A and 3B, the processing circuitry 250 calculates a target focus distance to the object 20 implementing the following equation (2):

$$s = \frac{2 D_F D_N}{D_F + D_N} = \frac{2 D_{max} D_{min}}{D_{max} + D_{min}} = \frac{2 \times 74 \times 94}{74 + 94} = 82.8 \text{ cm}$$

Once the processing circuitry 250 has calculated the target focus distance (e.g., 82.8 cm), the processing circuitry 250 provides a focus control signal FC to the optical components 220 (e.g., the autofocus components 202) to control the focus distance of the camera 200 and set the focus distance to the calculated target focus distance.

The aperture setting, N, (which may also be referred to as the lens f-number) of a camera is related to the size of the circle of confusion, c, of the camera, the lens focal length, f, (which may also be referred to as the focal lens) of the camera, and the near and far limits $D_N$, $D_F$ of the DOF in accordance with the following equation (3):

$$N = \frac{f^2}{c} \frac{D_F - D_N}{D_F(D_N - f) + D_N(D_F - f)}$$

When the subject distance is very large compared with the lens focal length, this equation can be simplified as the following equation (4):

$$N = \frac{f^2(D_F - D_N)}{2cD_F D_N}$$

In a case where the camera 200 is a 35 mm format digital camera with a 35 mm focal lens, with a circle of confusion size of 0.03 mm, and using the estimated minimum and maximum distances $D_{min}$, $D_{max}$ as approximates for the near and far limits $D_N$, $D_F$, the processing circuitry 250 calculates a target aperture f-number, N, for the camera 200 in the example of FIGS. 3A and 3B, by implementing the following equation (5):

$$N = \frac{f^2(D_F - D_N)}{2cD_F D_N} = \frac{f^2(D_{max} - D_{min})}{2cD_{max} D_{min}} = \frac{35^2(940-740)}{2 \times 0.03 \times 940 \times 740} = 5.9$$

Once the processing circuitry 250 has calculated the target aperture setting (e.g., 5.9), the processing circuitry 250 may provide an aperture control signal AC to the optical components 220 (e.g., the aperture components 204) to control an aperture setting of the camera 200 based on the estimated minimum and maximum distances to the object 20. Therefore, in the example of FIGS. 3A and 3B, the camera can be controlled to focus at 82.8 cm, and to use an aperture setting of f/5.9, with 5.9 being the f-number. These settings will provide a good bokeh effect in images captured by the camera 200 of the object 20.

In some cases, the calculated target aperture size may not correspond to an available aperture setting of the camera 200, since the aperture settings of cameras are typically adjustable in discrete steps, known as f-stops. In one or more embodiments, the processing circuitry 250 is configured to determine one of a plurality of selectable aperture settings of the camera 200 that has an associated aperture size nearest in value to the calculated target aperture size, and to select the determined aperture setting of the camera 200.

Selecting the aperture setting of the camera 200 that has an associated aperture size nearest in value to the calculated target aperture size will provide a good bokeh effect and the captured images will be of good quality. This is because there is a tolerance range for the aperture f-number (i.e., where the selected aperture f-number does not perfectly match the calculated target aperture f-number) which will still provide good quality images.

More particularly, the depth of field (DOF) may be calculated by the following equation (6):

$$DOF = \frac{2Ncf^2s^2}{f^4 - N^2c^2s^2}$$

From the above equation (5), it can be seen that if the focus distance (s) doesn't change, and with the focal lens (f) and the circle of confusion size (c) being fixed, the DOF is approximately proportional to the f-number (N). Accordingly, if the camera is adjusted to have a 10% smaller f-number, it will result in a 10% smaller DOF, and thus about 10% of the subject or object 20 in a horizontal directly will become blurred on the near end and far end.

However, an acceptable boundary from sharp to blurring in an image is not strictly limited in order to provide a good bokeh effect. For example, even a 10% of change in f-number will not generally produce particularly noticeable changes for the DOF for a target object in the captured image. Therefore, depending on the available aperture size settings on the camera 200, an approximate value to the calculated aperture size N can be used.

If the selected aperture size, f/N, is larger than the calculated target aperture size, then some parts at the far end and near end of the object 20 will become blurred. If the selected aperture size, f/N, is smaller than the calculated target aperture size, then some unwanted foreground or background may appear sharp along with the object 20. However, as stated above, the boundary from the sharp to blurring in the captured image is not strictly limited, so some variation from the calculated aperture f-number N can be acceptable to be used and will still provide a good bokeh effect.

As mentioned above, the aperture setting of cameras are typically adjustable in discrete steps, known as f-stops. These adjustable steps may be provided in different aperture scales, including full-stops, half-stops, and one-third stops. The ratio between the consecutive f-numbers is fixed for a lens, for example, a one-third stop lens has a ratio of $2^{1/3*0.5}$. For such a lens, the selectable aperture settings could be: f/1 (N=$2^{0/3*0.5}$), f/1.1 (N=$2^{1/3*0.5}$), f/1.2 (N=$2^{2/3*0.5}$), f/1.4, f/1.6, f/1.8, f/2, f/2.2, f/2.5, f/2.8, f/3.2, f/3.5, f/4, f/4.5, f/5, f/5.6, f/6.3, f/7.1, f/8, f/9, f/10, f/11, f/13, f/14, etc.

So, when the calculated target aperture f-number does not correspond to one of the available f-stops for the camera 200, the processing circuitry 250 controls the camera to select one of the available f-stops which is nearest in value to the value of the calculated target aperture f-number.

As noted above, the ratio, r, between any two consecutive f-numbers of a camera is fixed or is approximately the same, and therefore the selected f-number N for the camera 200 will be between $N_c/r$ and $N_c*r$, where $N_c$ is the calculated target aperture size or f-number.

Figure 4:
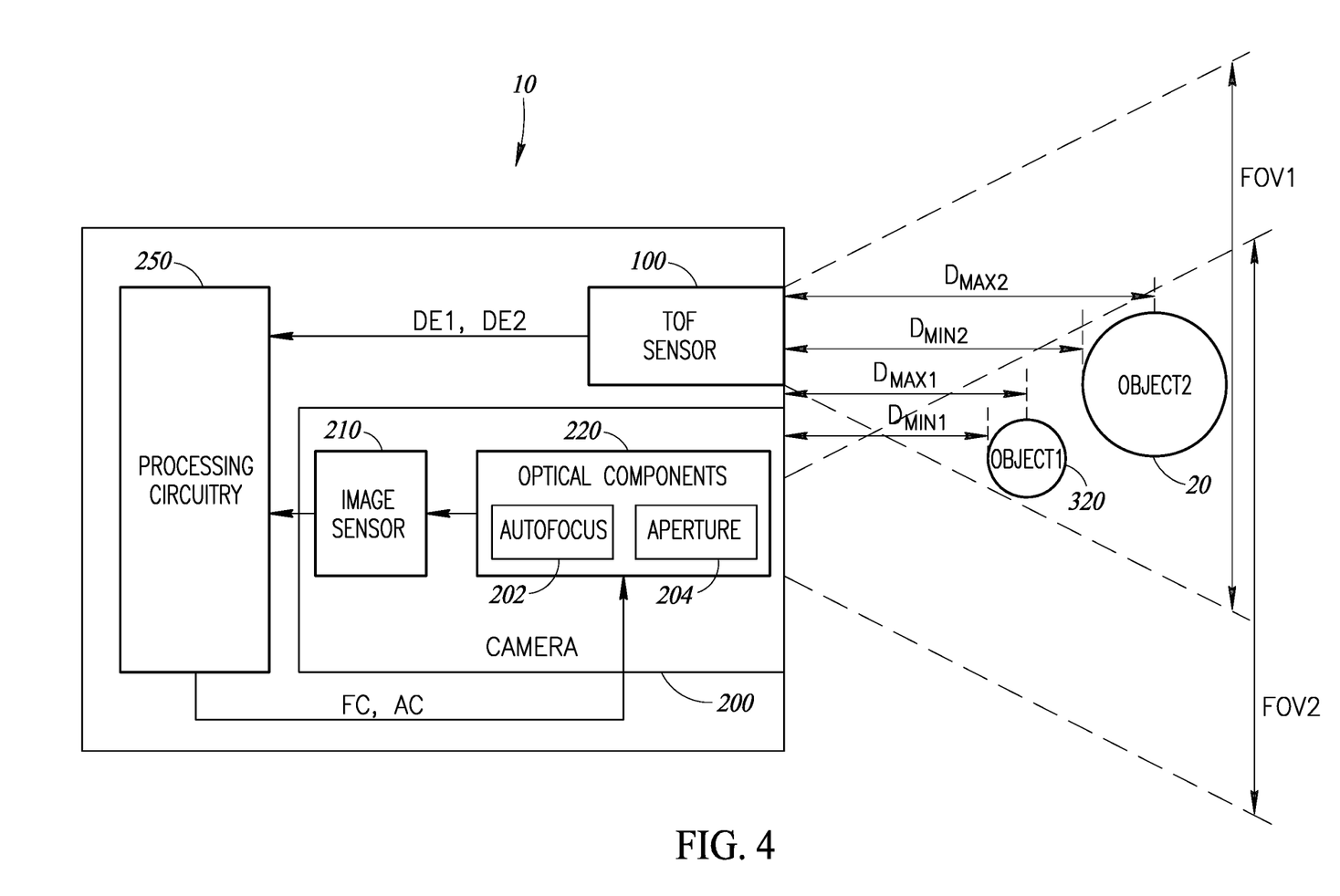
FIG. 4 is a functional block diagram illustrating estimation of minimum and maximum distances to multiple objects by the image capture device shown in FIG. 1, in accordance with one or more embodiments of the present disclosure.

FIG. 4 is a functional block diagram illustrating estimation of minimum and maximum distances to multiple objects by the image capture device 10 shown in FIG. 1, in accordance with one or more embodiments of the present disclosure. The difference between FIG. 1 and FIG. 4 is that in FIG. 4, there are two objects 20, 320 in the first and second fields of view FOV1, FOV2 of the image capture device 10. Two objects 20, 320 are illustrated merely by way of example in FIG. 4, and more than two objects may be detected by the TOF sensor 100 in some embodiments of the present disclosure.

As discussed above, the histogram based time-of-flight detection technique facilitates estimating depths of multiple objects in the field of view of the TOF sensor 100, and the depth information can be translated to minimum and maximum distances to each of the multiple objects.

The TOF sensor 100 estimates minimum and maximum distances $D_{min1}$, $D_{min2}$ to a first object 320 and estimates minimum and maximum distances $D_{min1}$, $D_{min2}$ to a second object 20 in substantially the same way as described above with respect to FIGS. 1 through 3B. For example, the light-emitting device 102 of the TOF sensor 100 transmits an optical pulse into the image scene. However, different from FIG. 1, the return sensor array 114 of the TOF sensor 100 receives portions of the optical pulse that are be reflected by respective surfaces of the two separate objects in the image scene. That is, the return sensor array 114 receives respective first portions of the optical pulse that are reflected off of the respective nearest surfaces of each of the objects 20, 320, and receives respective second portions of the optical pulse that is reflected off of the respective farthest surfaces of each of the objects 20, 320.

The distance estimation circuitry 116 estimates the minimum distance $D_{min1}$ and the maximum distance $D_{max1}$ to the object 320 based on a time between transmitting the optical pulse signal and receiving the respective first portion (i.e., the portions of the optical pulse reflected off the nearest surfaces of the object 320) and the respective second portion (i.e., the portions of the optical pulse reflected off the farthest surfaces of the object 320) of the return optical pulse signals. Similarly, the TOF sensor 100 estimates the minimum distance $D_{min2}$ and the maximum distance $D_{max2}$ to the object 20 based on a time between transmitting the optical pulse signal and receiving the respective first portion (i.e., the portions of the optical pulse reflected off the nearest surfaces of the object 20) and the respective second portion (i.e., the portions of the optical pulse reflected off the farthest surfaces of the object 20) of the return optical pulse signals. The TOF sensor 100 provides distance estimation signals DE1, DE2 representing the minimum and maximum distances to each of the objects 20, 320 to the processing circuitry 250.

In some embodiments, the image capture device 10 may allow a user to select one of the multiple objects which are detected by the TOF sensor, so that the user can select which of the detected objects to adjust the camera settings for. That is, the user can select which object to focus the camera and to select an appropriate aperture size in order to provide a good bokeh effect. For example, in some embodiments, the image capture device 10 may include a display which displays an image perceptible through the field of view FOV2 of the camera 200. The objects 20, 320 are visible in the display, and the user may thus select one of the objects 20, 320, for example by a touch input, one or more selectable buttons or the like. Once the user has selected one of the objects to be the target of the image, the processing circuitry 250 calculates the target focus distance based on the estimated minimum and maximum distances to the selected object, and provides a focus control signal FC to the optical components 220 (e.g., the autofocus components 202) to control the focus distance of the camera 200 and set the focus distance to the calculated target focus distance.

The processing circuitry 250 further calculates the target aperture size based on the minimum and maximum distances to the selected object, and provides an aperture control signal AC to the optical components 220 (e.g., the aperture components 204) to control an aperture setting of the camera 200 based on the estimated minimum and maximum distances to the selected object.

In accordance with the various embodiments provided herein, images having a good bokeh effect may be acquired for any object in an image scene. In particular, the TOF sensor is utilized to estimate the depth of the target object, based on the minimum and maximum distances to the target object, which are determined from the range data sensed by the TOF sensor. A focus distance and aperture size for providing a good bokeh effect can be calculated from the TOF histogram based ranging data, and the focus distance and aperture size can be automatically controlled by the imaging device so that the user will not need to manually adjust these settings to achieve a good bokeh effect before taking the picture.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
transmitting, by a time-of-flight sensor device, an optical pulse signal into an image scene;
receiving, by the time-of-flight sensor device, return optical pulse signals corresponding to portions of the transmitted optical pulse signal reflected by an object in the image scene;
estimating a minimum distance to the object based on a time between transmitting the optical pulse signal and receiving a first portion of the return optical pulse signals;
estimating a maximum distance to the object based on a time between transmitting the optical pulse signal and receiving a second portion of the return optical pulse signals; and
controlling a focus distance of a camera by calculating a target focus distance based on a product of the estimated minimum and maximum distances to the object,
wherein the calculated target focus distance is equal to (2*Dmax*Dmin)/(Dmax+Dmin), where Dmax is the estimated maximum distance and Dmin is the estimated minimum distance, and
wherein the controlling the focus distance of the camera includes controlling the focus distance of the camera based on the calculated target focus distance.

2. The method of claim 1, further comprising:
controlling an aperture setting of the camera based on the estimated minimum and maximum distances to the object.

3. The method of claim 2, further comprising:
controlling the aperture setting of the camera based on a circle of confusion size of the camera and a focal length of the camera.

4. The method of claim 3, further comprising:
calculating a target aperture size of the camera, wherein the target aperture size is equal to: $(f^2*(Dmax-Dmin))/(2*c*Dmax*Dmin)$, where f is the focal length of the camera, c is the circle of confusion size of the camera, Dmax is the estimated maximum distance, and Dmin is the estimated minimum distance; and
controlling an aperture setting of the camera includes selecting an aperture setting of the camera based on the calculated target aperture size.

5. The method of claim 4 wherein selecting the aperture setting of the camera includes:
determining one of a plurality of selectable aperture settings of the camera that has an associated aperture size nearest in value to the calculated target aperture size; and
selecting the determined aperture setting of the camera.

6. The method of claim 1 wherein the time-of-flight sensor device has a first field of view and the camera has a second field of view, the first and second field of views at least partially overlapping.

7. A device, comprising:
a time-of-flight sensor which, in operation, transmits an optical pulse signal into an image scene and receives return optical pulse signals corresponding to portions of the transmitted optical pulse signal reflected by at least one object in the image scene;
distance estimation circuitry which, in operation, estimates a minimum distance to the at least one object based on a time between transmitting the optical pulse signal and receiving a first portion of the return optical pulse signals, and estimates a maximum distance to the at least one object based on a time between transmitting the optical pulse signal and receiving a second portion of the return optical pulse signals;
a camera; and
processing circuitry coupled to the distance estimation circuitry and the camera, the processing circuitry, in operation, controls a focus distance of the camera by calculating a target focus distance based on a product of the estimated minimum and maximum distances to the at least one object,
wherein the calculated target focus distance is equal to (2*Dmax*Dmin)/(Dmax+Dmin), where Dmax is the estimated maximum distance and Dmin is the estimated minimum distance, and
wherein the controlling the focus distance of the camera controls the focus distance of the camera based on the calculated target focus distance.

8. The device of claim 7 wherein the processing circuitry, in operation, controls an aperture setting of the camera based on the estimated minimum and maximum distances to the at least one object.

9. The device of claim 8 wherein the processing circuitry, in operation, controls the aperture setting of the camera based on a circle of confusion size of the camera and a focal length of the camera.

10. The device of claim 9 wherein the processing circuitry, in operation:
calculates a target aperture size of the camera, the calculated target aperture size being equal to: (f^2*(Dmax−Dmin))/(2*c*Dmax*Dmin), where f is the focal length of the camera, c is the circle of confusion size of the camera, Dmax is the estimated maximum distance, and Dmin is the estimated minimum distance; and
selects an aperture setting of the camera based on the calculated target aperture size.

11. The device of claim 10 wherein the processing circuitry, in operation:
determines one of a plurality of selectable aperture settings of the camera that has an associated aperture size nearest in value to the calculated target aperture size; and
selects the determined aperture setting of the camera.

12. The device of claim 7 wherein the time-of-flight sensor device has a first field of view and the camera has a second field of view, and the first and second field of views are at least partially overlapping.

13. The device of claim 7 wherein the device is one of smart phone or a tablet computer.

14. A method, comprising:
transmitting, by a time-of-flight sensor device, an optical pulse signal into an image scene;
receiving, by the time-of-flight sensor device, first return optical pulse signals corresponding to portions of the transmitted optical pulse signal reflected by a first object in the image scene;
receiving, by the time-of-flight sensor device, second return optical pulse signals corresponding to portions of the transmitted optical pulse signal reflected by a second object in the image scene;
estimating a first minimum distance and a first maximum distance to the first object based on a time between transmitting the optical pulse signal and receiving the first return optical pulse signals;
estimating a second minimum distance and a second maximum distance to the second object based on a time between transmitting the optical pulse signal and receiving the second return optical pulse signals; and
controlling a focus distance of a camera by calculating a target focus distance based on one of: a product of the estimated first minimum and first maximum distances to the first object or a product of the estimated second minimum and second maximum distances to the second object and based on an equation:

$$(2*D\max*D\min)/(D\max+D\min),$$

where Dmax is an estimated maximum distance and Dmin is an estimated minimum distance.

15. The method of claim 14, further comprising:
receiving a selection of one of the first object or the second object; and
controlling the focus distance of the camera based on the selected one of the first object or the second object.

16. The method of claim 14, wherein the controlling the focus distance of the camera includes controlling the focus distance of the camera based on the calculated target focus distance.

17. The method of claim 14, further comprising:
controlling an aperture setting of the camera based on one of: the estimated first minimum and first maximum distances to the first object or the estimated second minimum and second maximum distances to the second object.

18. The method of claim 17, further comprising:
calculating a target aperture size of the camera,
wherein the controlling the aperture setting of the camera includes selecting an aperture setting of the camera based on the calculated target aperture size.

19. The method of claim 18 wherein selecting the aperture setting of the camera includes:
determining one of a plurality of selectable aperture settings of the camera that has an associated aperture size nearest in value to the calculated target aperture size; and
selecting the determined aperture setting of the camera.

20. A method, comprising:
transmitting, by a time-of-flight sensor device, an optical pulse signal into an image scene;
receiving, by the time-of-flight sensor device, return optical pulse signals corresponding to portions of the transmitted optical pulse signal reflected by an object in the image scene;
estimating a minimum distance to the object based on a time between transmitting the optical pulse signal and receiving a first portion of the return optical pulse signals;
estimating a maximum distance to the object based on a time between transmitting the optical pulse signal and receiving a second portion of the return optical pulse signals;

controlling a focus distance of a camera by calculating a target focus distance based on a product of the estimated minimum and maximum distances to the object; and controlling an aperture setting of the camera by calculating a target aperture size of the camera, wherein the target aperture size is equal to:

$$(f^2*(D\max - D\min))/(2*c*D\max*D\min),$$

where f is the focal length of the camera, c is the circle of confusion size of the camera, Dmax is the estimated maximum distance, and Dmin is the estimated minimum distance, and wherein the controlling the aperture setting of the camera includes selecting an aperture setting of the camera based on the calculated target aperture size.

21. A device, comprising:
a time-of-flight sensor which, in operation, transmits an optical pulse signal into an image scene and receives return optical pulse signals corresponding to portions of the transmitted optical pulse signal reflected by at least one object in the image scene;
distance estimation circuitry which, in operation, estimates a minimum distance to the at least one object based on a time between transmitting the optical pulse signal and receiving a first portion of the return optical pulse signals, and estimates a maximum distance to the at least one object based on a time between transmitting the optical pulse signal and receiving a second portion of the return optical pulse signals;
a camera; and
processing circuitry coupled to the distance estimation circuitry and the camera, the processing circuitry, in operation:
calculates a target aperture size of the camera, the calculated target aperture size being equal to: (f^2*(Dmax−Dmin))/(2*c*Dmax*Dmin), where f is the focal length of the camera, c is the circle of confusion size of the camera, Dmax is the estimated maximum distance, and Dmin is the estimated minimum distance; and
selects an aperture setting of the camera based on the calculated target aperture size.

22. A method, comprising:
transmitting, by a time-of-flight sensor device, an optical pulse signal into an image scene;
receiving, by the time-of-flight sensor device, first return optical pulse signals corresponding to portions of the transmitted optical pulse signal reflected by a first object in the image scene;
receiving, by the time-of-flight sensor device, second return optical pulse signals corresponding to portions of the transmitted optical pulse signal reflected by a second object in the image scene;
estimating a first minimum distance and a first maximum distance to the first object based on a time between transmitting the optical pulse signal and receiving the first return optical pulse signals;
estimating a second minimum distance and a second maximum distance to the second object based on a time between transmitting the optical pulse signal and receiving the second return optical pulse signals;
controlling a focus distance of a camera by calculating a target focus distance based on one of: a product of the estimated first minimum and first maximum distances to the first object or a product of the estimated second minimum and second maximum distances to the second object;
controlling an aperture setting of the camera based on one of: the estimated first minimum and first maximum distances to the first object or the estimated second minimum and second maximum distances to the second object; and
calculating a target aperture size of the camera, wherein the controlling the aperture setting of the camera includes selecting an aperture setting of the camera based on the calculated target aperture size, wherein selecting the aperture setting of the camera includes:
determining one of a plurality of selectable aperture settings of the camera that has an associated aperture size nearest in value to the calculated target aperture size; and
selecting the determined aperture setting of the camera.

* * * * *